(12) United States Patent
Okada et al.

(10) Patent No.: US 8,512,610 B2
(45) Date of Patent: Aug. 20, 2013

(54) NONWOVEN FABRIC SHEET AND METHOD FOR PRODUCING SAME

(75) Inventors: Kazuya Okada, Sodegaura (JP); Yasuhiro Sudou, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 327 days.

(21) Appl. No.: 12/706,934

(22) Filed: Feb. 17, 2010

(65) Prior Publication Data

US 2010/0148390 A1 Jun. 17, 2010

Related U.S. Application Data

(62) Division of application No. 10/599,774, filed as application No. PCT/JP2005/006857 on Apr. 7, 2005, now abandoned.

(30) Foreign Application Priority Data

Apr. 9, 2004 (JP) ................................. 2004-116139

(51) Int. Cl.
*B29D 28/00* (2006.01)
(52) U.S. Cl.
USPC ........................... 264/103; 264/165; 264/175
(58) Field of Classification Search
USPC .......................................... 264/103, 165, 175
See application file for complete search history.

(56) References Cited

U.S. PATENT DOCUMENTS

| | | | |
|---|---|---|---|
| 3,618,190 A * | 11/1971 | Vernazza et al. | 26/51 |
| 3,978,185 A * | 8/1976 | Buntin et al. | 264/518 |
| 5,308,691 A | 5/1994 | Lim et al. | |
| 6,284,680 B1 | 9/2001 | Aikawa et al. | |
| 7,183,020 B2 | 2/2007 | Sudou et al. | |
| 7,405,172 B2 | 7/2008 | Shigematsu et al. | |
| 2002/0090876 A1 | 7/2002 | Takase et al. | |

FOREIGN PATENT DOCUMENTS

| | | |
|---|---|---|
| JP | 04-327258 | 11/1992 |
| JP | 05-295645 | 11/1993 |
| JP | 08-144166 | 6/1996 |
| JP | 08-246309 | 9/1996 |
| JP | 09-503459 | 4/1997 |
| JP | 2004-100047 | 4/2004 |
| JP | 2005-39931 | 2/2005 |
| JP | 200529931 | 2/2005 |

OTHER PUBLICATIONS

Taiwanese Office Action dated Jun. 23, 2007 corresponding to U.S. Appl. No. 10/599,774, filed Oct. 9, 2006.
International Search Report for PCT/JP2005/006857 dated Aug. 2, 2005.
U.S. Office Action dated Apr. 2, 2009 corresponding to U.S. Appl. No. 10/599,774, filed Oct. 9, 2006.
U.S. Final Office Action dated Nov. 23, 2009 corresponding to U.S. Appl. No. 10/599,774, filed Oct. 9, 2006.

* cited by examiner

*Primary Examiner* — Yogendra Gupta
*Assistant Examiner* — John Robitaille
(74) *Attorney, Agent, or Firm* — Rankin, Hill & Clark LLP

(57) ABSTRACT

The nonwoven fabric sheet of the present invention is characterized by a porosity in the range of 0.3 to 0.7 and an average pore size in the range of 0.5 μm to 5.0 μm. The nonwoven fabric sheet of the present invention preferably has a maximum pore size (μm)/average pore size (μm) ratio of 1.30 or lower. The nonwoven fabric sheet of the present invention is obtained by press-molding a nonwoven fabric at a temperature lower than the melting point of the thermoplastic resin which constitutes the nonwoven fabric sheet. According to the present invention, there is provided a nonwoven fabric sheet that has a high porosity, small uniform pore sizes and excellent productivity, which can suitably be used in various applications such as filters, light diffusing material, liquid absorber and heat insulating materials; and a method for producing the nonwoven fabric sheet.

13 Claims, No Drawings

NONWOVEN FABRIC SHEET AND METHOD FOR PRODUCING SAME

CROSS-REFERENCE TO RELATED APPLICATIONS

This application is a Division of application Ser. No. 10/599,774 filed Oct. 9, 2006, the entire contents of which is hereby incorporated by reference.

TECHNICAL FIELD

The present invention relates to a nonwoven fabric sheet with a high porosity and a small uniform pore size, and a method of producing the same.

BACKGROUND ART

It has been known that a nonwoven fabric with fine openings can be produced from fibers with a small fiber diameter. One of such methods is calendering a nonwoven fabric using heated rollers, wherein an opening size is decreased by reducing distances between fibers. When a nonwoven fabric is subjected to calendering, however, the thickness is reduced and the porosity of the nonwoven fabric is lowered. Accordingly, when calendering is performed under conditions to obtain a nonwoven fabric with sufficiently small openings, an intrinsic property of nonwoven fabrics of having voids therein is impaired. When heated rollers are used, fibers on the surfaces of a nonwoven fabric are thermally fusion-bonded, and thus the fibers may form a film or the pores may be squashed (for example, see Japanese Patent Application Laid-Open No. 8-246309). It has been pointed out that, when using a nonwoven fabric for light diffusion materials, liquid absorbers, filter materials, heat insulating materials and the like, if the nonwoven fabric has a low porosity, a reduction in diffusion performance, liquid retention performance, lifetime of filter material, heat insulation performance, or the like, is caused. Accordingly, a nonwoven fabric with some extent of high porosity and small uniform pore size has been desired.

[Patent Document 1] Japanese Patent Application Laid-open No. 8-246309

DISCLOSURE OF INVENTION

An object of the present invention is to provide a nonwoven fabric sheet with a high porosity and small uniform pore size. Another object of the present invention is to provide a high productivity method of producing such a nonwoven fabric sheet.

With the above-mentioned circumstances in mind, the present inventors pursued diligent research and, surprisingly, found that a nonwoven fabric sheet with small uniform pore size could be obtained, while maintaining a high porosity, by controlling conditions of pressing. Thus, they attained the present invention.

That is, the present invention provides a nonwoven fabric sheet characterized by a porosity in the range of 0.3 to 0.7 and a maximum pore size in the range of 0.5 μm to 5.0 μm.

Effects of the Invention

The nonwoven fabric sheet according to the present invention has a high porosity, relatively fine pore sizes, and a relatively uniform pore size distribution, and thus can be suitably used in various applications such as filters, light diffusion materials, liquid absorbers, and heat insulating materials. The nonwoven fabric sheet according to the present invention has a uniform pore size and thus allows only substances having a certain size to pass through.

BEST MODE FOR CARRYING OUT THE INVENTION

Raw Material Resins

The raw material resins of fibers that constitute the nonwoven fabric according to the present invention are not particularly limited, and various publicly known thermoplastic resins may be utilized. Among these, there may be mentioned, for example, polyolefins (polyethylene, polypropylene, poly(4-methyl-1-pentene), polybutene, and the like), polyesters (polyethylene terephthalate, polybutylene terephthalate, polyethylene naphthalate, and the like), polyamides (nylon-6, nylon-66, poly(meta-xylene adipamide), and the like), thermoplastic elastomers (polyolefin elastomers, polyester elastomers, and the like), and polyphenylene sulfite.

Among these thermoplastic resins, polyolefins are preferable, and polypropylene-based polymers and methylpentene-based polymers such as copolymers of a methylpentene polymer or methylpentene and an α-olefin, are particularly preferable for their excellent heat resistance.

Examples of the polypropylene-based polymers include propylene homopolymers and copolymers of propylene and another α-olefin (ethylene, butene, hexene, 4-methyl-1-pentene, octene, or the like), an unsaturated carboxylic acid or a derivative thereof (acrylic acid, maleic anhydride, or the like), an aromatic vinyl monomer (styrene or the like), or the like. Considering workability into nonwoven fabrics, mechanical strength and other properties, it is preferable to use polypropylene having a melt flow rate (MFR), measured at 230° C. under 2.16 kg load, of 10 g/10 min to 2000 g/10 min, preferably 800 g/10 min to 1500 g/10 min, and a melting point of 130° C. to 165° C., preferably about 150° C. to 163° C. Such polypropylene-based polymers can be obtained by various known methods.

As the methylpentene-based polymers, preferred ones are 4-methyl-1-penetene homopolymers or random copolymers of 4-methyl-1-pentene and 0.1% by weight to 20% by weight, preferably 0.1% by weight to 10% by weight, of at least one kind of α-olefin having 2 to 20 carbon atoms, preferably 10 to 20 carbon atoms, such as ethylene, propylene, 1-butene, 1-hexene, 1-octene, 1-decene, 1-dodecene, 1-tetradecene, 1-hexadecene, 1-octadecene, and 1-eicocene. Considering workability into nonwoven fabrics, mechanical strength, and other properties, it is preferable to use a methylpentene-based polymer having a melt flow rate, measured at 260° C. under 5 kg load, of about 100 g/10 min to 1000 g/10 min, preferably about 150 g/10 min to 500 g/10 min, and a melting point of about 210° C. to 280° C., preferably about 230° C. to 250° C. Methylpentene-based polymers having a Vicat softening point (ASTM D 1525) of 140° C. or higher, preferably 160° C. or higher, more preferably 170° C. or higher are desirable, since the obtained nonwoven fabric sheet has excellent heat resistance. These methylpentene-based polymers can be produced using a stereospecific catalyst, and commercially available ones may also be used as supplied.

Nonwoven Fabric

A nonwoven fabric used as a raw material of the nonwoven fabric sheet of the present invention is not particularly limited according to other requirements as long as it satisfies the requirement that the nonwoven fabric has a porosity in the range of 0.3 to 0.7 and a maximum pore size in the range of 0.5 μm to 5.0 μm. The nonwoven fabric used as a raw material of the nonwoven fabric sheet of the present invention may be a nonwoven fabric produced by any publicly known method and may be produced, for example, by a spun-bonding method, a melt-blown method, or a flash-spinning method. Among these, nonwoven fabrics produced by a melt-blown or a flash-spinning method is preferable since nonwoven fabrics with a fine pore size can easily be obtained. Spinning and producing nonwoven fabrics by the melt-blown method is particularly preferable, since the process can be smoothly performed with good productivity and nonwoven fabrics composed of homogeneous fibers can easily be obtained.

Nonwoven Fabric Sheet

The nonwoven fabric sheet according to the present invention is produced by press molding the above-described nonwoven fabric and has a porosity in the range of 0.3 to 0.7 and a maximum pore size in the range of 0.5 μm to 5.0 μm. Preferably, the nonwoven fabric sheet according to the present invention further has a "maximum pore size (μm)/average pore size (μm)" ratio of 1.30 or lower.

Porosity is a ratio of a volume of voids to the total volume of a nonwoven fabric composed of resin material and voids, represented by the equation: porosity=1−basis weight $(g/m^2)$/[density of fiber $(g/cm^3)$×thickness of nonwoven fabric (μm)]. A maximum pore size is the maximum value of pore diameter in a nonwoven fabric sheet, and an average pore size is an average of the diameters of all pores in a nonwoven fabric sheet.

The maximum pore size and average pore size of the nonwoven fabric sheet according to the present invention are determined by measuring the pore size of the nonwoven fabric with a Coulter Porometer (manufactured by Coulter Electronics Ltd.). Measurement with the Coulter Porometer was performed in accordance with ASTM E1294-89. A maximum pore size, an average pore size, and the like, of a sheet sample can be determined by this method. The method is specifically conducted as described below. A sample is wetted with a standard liquid. The wetted sample, completely wetted with the liquid having a low surface tension and a low vapor pressure, is set in a sample holder and subjected to measurement. When pressure is applied from one side of the sheet, the standard liquid in the sheet is released by air pressure to empty the pores and air flow is generated. As the pressure is continuously increased and the pores in the sheet are continuously emptied, the air flow passing through the sheet is recorded as a function of the pressure supplied. A point where the first air flow with a certain volume is generated is recognized as a bubble point (maximum pore size). The operation is continued until the size of the pore size reaches the smallest detectable level. Data thus obtained is compared with the data of air flow rate versus air pressure obtained in a dried sheet. A pore size distribution is obtained from the curve under wet condition and the curve under dry condition, from which an average pore size is obtained. POROFIL (trade name, manufactured by Coulter Electronics Ltd.) or the like is used as the standard liquid.

The porosity of the nonwoven fabric sheet according to the present invention is in the range of 0.3 to 0.7, preferably 0.4 to 0.6, and the maximum pore size is in the range of 0.5 μm to 5.0 μm, preferably 0.5 μm to 3.0 μm, further preferably 0.5 μm to 2.0 μm. More preferably, in addition to the above requirements, the ratio "maximum pore size/average pore size" is 1.30 or lower, more preferably in the range of 1.0 or higher and 1.25 or lower, particularly preferably in the range of 1.0 or higher and 1.1 or lower. When a sheet has the above properties, the pore sizes are small and the porosity is high, and thus the sheet has good permeability, and further has a uniform pore size. Since such a sheet therefore allows only a substance of a certain size to pass through, the sheet can be used in various applications. As the applications, there may be mentioned, for example, filters, light dispersing materials, liquid absorbers, and heat insulating materials. When the nonwoven fabric sheet according to the present invention is used as a filter, the filter can selectively trap particles of a particular size. Even if the sheet is used for a long time, notwithstanding its high efficiency of trapping particles of small particle sizes, the sheet is hardly clogged with the particles, and the speed of treating a filtering liquid hardly decreases. When the sheet is used as a filter, substances to be filtered are not limited and may be in the form of either gasses or liquids. When the nonwoven fabric sheet according to the present invention is used as a light diffusing material, it is superior in performances as a light diffusing plate since there are a large number of boundary regions between fiber surfaces and voids where light is diffused, and the areas of the boundary regions are large, therefore the sheet exhibits a high light diffusivity. When the nonwoven fabric sheet according to the present invention is used as a liquid absorber, since there are a large number of small pores, the permeability is excellent and the liquid retention ability is better than that of a sheet with large pores, and when it is used as a wiper, remaining after wiping hardly occurs and a large amount of liquid can be treated through adsorption. When the nonwoven fabric sheet according to the present invention is used as a heat insulating material, it is highly effective in blocking contaminants and excellent in heat insulation performance due to its small pore size. A maximum pore size being too large is not preferable, since small particles pass through the nonwoven fabric sheet, and a porosity being too high is not preferable, since the nonwoven fabric sheet may have uneven pore sizes.

Other properties of the nonwoven fabric sheet according to the present invention are not particularly limited as long as the above-described properties are satisfied. However, a nonwoven fabric before being subjected to press-molding preferably has an average fiber diameter of 0.5 μm to 7 μm, more preferably 1 μm to 3 μm, and preferably a basis weight of 5 $g/m^2$ to 60 $g/m^2$, more preferably 10 $g/m^2$ to 20 $g/m^2$.

A strength retention material may be laminated onto the nonwoven fabric sheet according to the present invention. The strength retention material is not particularly limited as long as it increases the strength of the nonwoven fabric sheet according to the present invention by being laminated thereon. For example, there may be mentioned spun-bonded nonwoven fabrics, melt-blown nonwoven fabrics, dry-laid nonwoven fabrics, woven fabrics, paper, films, and the like, obtained by conventionally known methods. The materials that do not impair the properties of the nonwoven fabric according to the present invention and have favorable permeability and a large pore size are preferably utilized. Various strength retention materials to be laminated may be selected depending on the application. In some cases, the strength retention material may improve not only strength but also filtering property for trapping fine particles or the like, liquid absorption property, light diffusion property, gas retention property, or the like. For example, a filter in which a spun-bonded nonwoven fabric obtained by a conventionally known method is laminated on the nonwoven fabric sheet according to the present invention can have an increased external strength and, in addition, an improved filtering property since the nonwoven fabric obtained by the conventional method traps large particles, whereas small particles which have passed through this nonwoven fabric are trapped by the nonwoven fabric sheet according to the present invention. When laminating such a strength retention material, one layer of the nonwoven fabric sheet or two or more layers thereof may be laminated and used.

Method for Producing a Nonwoven Fabric Sheet

The method for producing the nonwoven fabric sheet according to the present invention comprises press-processing of a nonwoven fabric, which is obtained by an ordinary known method, at a particular temperature with a particular pressing means. As a preferable method for producing the nonwoven fabric sheet according to the present invention, there may be mentioned a method wherein a thermoplastic resin is molded into a resin molded article in the form of nonwoven fabric by a melt-blown method; and this resin molded article in the form of nonwoven fabric is press-molded at a temperature lower than the melting point of the thermoplastic resin with a pressing means having a Young's modulus of 20 kg/cm$^2$ to 600 kg/cm$^2$.

The pressing means according to the present invention is used to improve surface smoothness and strength of a nonwoven fabric by applying a particular temperature and a particular pressure on the nonwoven fabric obtained by an ordinary known method. When this pressing means is used, the surface of the pressing means deforms in compliance with microscopic variations in thickness of a nonwoven fabric, and thus pressure is equally applied. As a result, it is presumed that the porosity of the nonwoven fabric is equalized and that the pore sizes become small and uniform. The shape of the pressing means is not particularly limited. For example, a pressing means having the above-mentioned particular elastic modulus may be provided on one of the pressing surfaces of a pressing machine while the other pressing surface being made of a metal such as stainless steel. For a molding machine composed of multiple rollers, the aforementioned pressing means may be provided on the surface of one roller while the surface of another roller being made of a hard substance such as a metal, or the aforementioned pressing means may be provided on the surfaces of both rollers. When production is performed by using a molding machine composed of multiple rollers in which the aforementioned pressing means is provided on the surface of one roller and the surface of another roller is made of a hard substance, it is industrially advantageous since the process is easy and convenient and a long nonwoven fabric sheet can easily be produced.

For the pressing means according to the present invention, it is important to use an elastic material having a Young's modulus of 20 kg/cm$^2$ to 600 kg/cm$^2$, preferably 20 kg/cm$^2$ to 300 kg/cm$^2$. As such materials, there may be specifically mentioned paper, cotton, felt, fabrics, wood, rubbers, foamed plastics, and the like. Among these, rubbers and foamed plastics with rubber elasticity are preferable since they have an appropriate elastic modulus. As rubbers, there may be mentioned materials such as urethane rubbers, styrene-butadiene rubbers, olefinic elastomers, thermoplastic elastomers, and silicon rubbers. As fabrics, there may be mentioned various materials such as polyesters, silk, and polyurethanes. Such fabrics can appropriately be made by selecting weaving or knitting methods, and when the fabric is thin, it may be used as a laminate of a plurality of pieces. When ordinary metal rollers are used, the pressing members do not follow microscopic variations in the thickness of a nonwoven fabric, and thus a higher pressure is applied on a thicker part whereas pressure is hardly imposed on a thinner part. Consequently, a porosity is drastically reduced and pores are clogged in the thicker part, while a porosity remains high and pore sizes are large in the thinner part. In such a case, the nonwoven fabric has a large pore size and a wide pore size distribution, and a desired nonwoven fabric sheet may not be obtained.

The pressing according to the present invention may be performed on one or both surfaces of a nonwoven fabric, or may be performed only in a part thereof.

The press-molding according to the present invention is preferably performed at a temperature in the range from ordinary temperature to a temperature not higher than the melting point of a thermoplastic resin which constitutes a nonwoven fabric sheet. When press-molding is performed at ordinary temperature or higher, it is performed preferably at a temperature lower than the melting point of the thermoplastic resin by 10° C. or more, more preferably at a temperature lower than the melting point of the thermoplastic resin by 20° C. or more. When press-molding is performed at a temperature equal to or higher than the melting point of the resin which constitutes the nonwoven fabric sheet, fibers of the nonwoven fabric may fuse to clog the pores of the nonwoven fabric sheet, or form a film. However, heating to some degree facilitates shaping of the nonwoven fabrics. Heating conditions at the time of press-molding may be selected as appropriate depending on pressuring conditions and surface materials of pressing means such as rollers, and may also be selected depending on properties of a resin used as a raw material of the nonwoven fabric.

For a nonwoven fabric made of polypropylene, for example, conditions may be selected so that the temperature of the pressing member that comes into contact with at least one surface of a melt-blown nonwoven fabric is 30° C. to 150° C., preferably about 50° C. to 130° C. For example, when using a pressing means wherein the pressing member that comes into contact with one surface of a melt-blown nonwoven fabric is made of metal, and the pressing member that comes into contact with the other surface of the fabric is made of rubber, temperature conditions may be selected so that the temperature of the metal-made pressing member is about 80° C. to 130° C., and that the temperature of the rubber-made pressing member is about 50° C. to 100° C.

For nonwoven fabric made of a methylpentene-based polymer, for example, conditions may be selected so that the temperature of the pressing member that comes into contact with at least one surface of a melt-blown nonwoven fabric is 80° C. to 230° C., preferably about 150° C. to 200° C. For example, when using a pressing means wherein the pressing member that comes into contact with one surface of a melt-blown nonwoven fabric is made of metal, and the pressing member that comes into contact with the other surface of the fabric is made of rubber, temperature conditions may be selected so that the temperature of the metal-made pressing member is about 120° C. to 200° C. and that the temperature of the rubber-made pressing member is about 90° C. to 170° C.

The press-molding according to the present invention is preferably performed at a low pressure when the temperatures of the pressing members are high, while at a high pressure when the temperatures of the pressing members are low. In the above temperature range, a linear pressure is usually 5 kg/cm to 50 kg/cm, preferably 10 kg/cm to 30 kg/cm. In this case, a nonwoven fabric sheet having a large number of small pores is obtained. The linear pressure is selected as appropriate depending on elastic pressing means to be used, temperature at the time of pressing, material of a nonwoven fabric sheet, and other conditions.

When the temperature and the pressure during press-molding are too high, fibers fuse excessively to clog the pores, and thus such conditions are not preferable. When the temperature and the pressure are too low, sufficiently fine pores may not be formed in the resultant sheet, and thus such conditions are not preferable.

With the method for producing the nonwoven fabric sheet according to the present invention, a nonwoven fabric sheet that has small pore sizes, a small variation in pore size and a high porosity, and is excellent in filtering property in trapping fine particles or the like, liquid absorption property, light diffusing property, gas retention property, and the like, can be produced from inexpensive materials using an easy and convenient method. Further, the nonwoven fabric sheet according to the present invention, since it is molded by pressing a whole fabric uniformly, has a reduced partial decrease in strength caused by occurrence of uncompressed parts and is superior in mechanical strength as compared with nonwoven fabric sheets produced by conventional processing methods.

EXAMPLES

The present invention will be further specifically described with reference to examples, but the present invention is not limited to these examples.

Measurements and evaluations in examples and comparative examples were performed as described below. The results obtained are shown in Table 1. In the table, PP represents polypropylene and 4MP represents a 4-methyl-1-pentene copolymer.

(1) Fiber Diameter (μm)

Fibers were photographed with an electron microscope, diameters of 50 fibers were measured, and an average of the diameters was calculated.

(2) Basis Weight (g/m$^3$)

A test specimen of 100 mm×100 mm was taken and weighed, and the weight per m$^2$ was calculated.

(3) Membrane Thickness (μm)

Membrane thicknesses of nine samples that were used for the measurement of basis weight were measured with a digital thickness meter in accordance with JIS Z1702, and an average was calculated.

(4) Porosity

Densities of fibers were determined in accordance with ASTM D1505. Porosity was calculated from the following equation:

Porosity=1−basis weight/(density of fiber×thickness)

(5) Average Pore Size and Maximum Pore Size

Average pore sizes and maximum pore sizes were measured with a Coulter Porometer manufactured by Coulter Electronics Ltd. by procedures described below, under the following conditions. Measurements were performed at ordinary temperature (20° C.).

Measurement Mode: PSA (pore size analysis)

Wetting Fluid: POROFIL (trade name, manufactured by Coulter Electronics Ltd.)

Tourtuosity Factor: 1

Sample Holder: 25 mm

Procedures: A sample was wetted with the standard liquid, POROFIL (trade name, manufactured by Coulter Electronics Ltd.) and set in a sample holder. Measurement was then started.

Measurements were performed for a wet run and a dry run. An average particle size and a maximum particle size were obtained from the relationship between a difference in gas flow passing through the sample between the wet run and dry run and a pore size, a pore size vs. flow rate cumulative graph.

Example 1

Polypropylene (manufactured by Polymirae Co., Ltd.; melting point: 150° C.; melt flow rate measured at 230° C. under 2.16 kg load: 1000 g/10 min) was spun by a melt-blown method at a resin temperature of 300° C. and a spinning air flow of 25 Nm$^3$/kg (air flow amount used for spinning 1 kg of a resin), and fibers were collected with a web former to obtain a melt-blown nonwoven original fabric with a basis weight of 12 g/m$^2$. The average fiber diameter of the nonwoven original fabric obtained was 2.7 μm. The nonwoven original fabric obtained was pressed with a roll machine having a rubber roller (Young modulus: 200 kg/cm$^2$) at 100° C. and a steel roller at 100° C. The linear pressure was set to 20 kg/cm and the processing speed was set to 10 m/min. A nonwoven fabric sheet having properties shown in Table 1 was obtained. The obtained nonwoven fabric sheet had a large number of small pores and its appearance was white.

Example 2

Polypropylene (manufactured by Polymirae Co., Ltd.; melting point: 150° C.; melt flow rate at 230° C. under 2.16 kg load: 1000 g/10 min) was spun by a melt-blown method at a resin temperature of 300° C. with a spinning air flow of 40 Nm$^3$/kg (air flow amount used for spinning 1 kg of a resin), and fibers were collected with a web former to obtain a melt-blown nonwoven original fabric with a basis weight of 12 g/m$^2$. The average fiber diameter of the nonwoven original fabric obtained was 1.8 μm. The nonwoven original fabric obtained was pressed with a roll machine having a rubber roller at 100° C. and a steel roller at 100° C. in the same manner as Example 1. The linear pressure was set to 20 kg/cm and the processing speed was set to 10 m/min. A nonwoven fabric sheet having properties shown in Table 1 was obtained. The obtained nonwoven fabric sheet had a large number of small pores and its appearance was white.

Example 3

Spinning was performed under the same spinning conditions as Example 2 to obtain a melt-blown original fabric with a basis weight of 20 g/m$^2$. The nonwoven original fabric obtained was pressed with a roll machine having a rubber roller at 100° C. and a steel roller at 100° C. in the same manner as Example 1. The linear pressure was set to 20 kg/cm and the processing speed was set to 10 m/min. A nonwoven fabric sheet having properties shown in Table 1 was obtained. The obtained nonwoven fabric sheet had a large number of small pores and its appearance was white.

Example 4

4-Methyl-1-pentene copolymer (Mitsui Chemicals, Inc.; melting point: 240° C.; a melt flow rate at 260° C. under 5 kg load: 180 g/10 min) was spun by a melt-blown method at a resin temperature of 360° C. with a spinning air flow of 60 Nm$^3$/kg (air flow amount used for spinning 1 kg of a resin), and fibers were collected with a web former to obtain a melt-blown nonwoven original fabric with a basis weight of 12 g/m$^2$. The average fiber diameter of the nonwoven original fabric obtained was 1.8 μm. The nonwoven original fabric obtained was pressed with a roll machine having a rubber roller at 160° C. and a steel roller at 160° C. in the same manner as Example 1. The linear pressure was set to 20 kg/cm and the processing speed was set to 10 m/min. A nonwoven fabric sheet having properties shown in Table 1 was obtained. The obtained nonwoven fabric sheet had a large number of small pores and its appearance was white.

Example 5

4-Methyl-1-pentene copolymer (Mitsui Chemicals, Inc.; melting point: 240° C.; melt flow rate at 260° C. under 5 kg load: 180 g/10 min) was spun by a melt-blown method at a resin temperature of 360° C. with a spinning air flow of 90 Nm³/kg (air flow amount used for spinning 1 kg of a resin), and fibers were collected with a web former to obtain a melt-blown nonwoven original fabric with a basis weight of 12 g/m². The average fiber diameter of the nonwoven original fabric obtained was 1.2 μm. The nonwoven original fabric obtained was pressed with a roll machine having a rubber roller at 160° C. and a steel roller at 160° C. in the same manner as Example 1. The linear pressure was set to 20 kg/cm and the processing speed was 10 m/min. A nonwoven fabric sheet having properties shown in Table 1 was obtained. The obtained nonwoven fabric sheet had a large number of small pores and its appearance was white.

Comparative Example 1

The nonwoven original fabric obtained in the same manner as Example 1 was pressed with a roll machine having two steel rollers at 70° C. The linear pressure was set to 20 kg/cm and the processing speed was set to 10 m/min. A nonwoven fabric sheet having properties shown in Table 1 was obtained. Appearance of the obtained nonwoven fabric sheet was such that a white sheet was dotted with transparent parts.

Comparative Example 2

The nonwoven original fabric obtained in the same manner as Example 1 was pressed with a roll machine having two steel rollers at 100° C. The linear pressure was set to 20 kg/cm and the processing speed was set to 10 m/min. A nonwoven fabric sheet having properties shown in Table 1 was obtained. Appearance of the obtained nonwoven fabric sheet was such that a white sheet was dotted with transparent parts.

Comparative Example 3

The nonwoven original fabric obtained in the same manner as Example 2 was pressed with a roll machine having two steel rollers at 70° C. The linear pressure was set to 20 kg/cm and the processing speed was set to 10 m/min. A nonwoven fabric sheet having properties shown in Table 1 was obtained. Appearance of the obtained nonwoven fabric sheet was such that a white sheet was dotted with transparent parts.

Comparative Example 4

The nonwoven original fabric obtained in the same manner as Example 4 was pressed with a roll machine having two steel rollers at 90° C. The linear pressure was set to 20 kg/cm and the processing speed was set to 10 m/min. A nonwoven fabric sheet having properties shown in Table 1 was obtained. Appearance of the obtained nonwoven fabric sheet was such that a white sheet was dotted with transparent parts.

Comparative Example 5

The nonwoven original fabric obtained in the same manner as Example 4 was pressed with a roll machine having two steel rollers at 160° C. The linear pressure was set to 20 kg/cm and the processing speed was set to 10 m/min. A nonwoven fabric sheet having properties shown in Table 1 was obtained. Appearance of the obtained nonwoven fabric sheet was such that a white sheet was dotted with transparent parts.

TABLE 1

|  | Example | | | | | Comparative example | | | | |
| --- | --- | --- | --- | --- | --- | --- | --- | --- | --- | --- |
|  | 1 | 2 | 3 | 4 | 5 | 1 | 2 | 3 | 4 | 5 |
| Raw material | PP | PP | PP | 4MP | 4MP | PP | PP | PP | 4MP | 4MP |
| Roller materials | rubber/steel | rubber/steel | rubber/steel | rubber/rubber | rubber/steel | steel/steel | steel/steel | steel/steel | steel/steel | steel/steel |
| Roller temperature (° C.) | 100 | 100 | 100 | 160 | 160 | 70 | 100 | 70 | 90 | 160 |
| Density (g/cm3) | 0.91 | 0.91 | 0.91 | 0.83 | 0.83 | 0.91 | 0.91 | 0.91 | 0.83 | 0.83 |
| Fiber diameter (μm) | 2.7 | 1.8 | 1.8 | 1.8 | 1.2 | 2.7 | 2.7 | 1.8 | 1.8 | 1.8 |
| Basis weight (g/m²) | 12 | 12 | 20 | 12 | 12 | 12 | 12 | 12 | 12 | 12 |
| Membrane thickness (μm) | 25 | 25 | 37 | 28 | 28 | 25 | 17 | 25 | 28 | 18 |
| Porosity | 0.47 | 0.47 | 0.41 | 0.48 | 0.48 | 0.47 | 0.22 | 0.47 | 0.48 | 0.20 |
| Maximum pore size (μm) | 4.5 | 3.0 | 2.5 | 2.6 | 1.4 | 8.2 | 7.1 | 5.6 | 5.5 | 2.8 |
| Average pore size (μm) | 3.6 | 2.4 | 1.1 | 2.4 | 1.3 | 5.9 | 5.1 | 3.8 | 3.9 | 2 |
| Maximum pore size/average pore size | 1.25 | 1.25 | 2.27 | 1.08 | 1.08 | 1.39 | 1.39 | 1.47 | 1.41 | 1.40 |

The invention claimed is:

1. A method of producing a nonwoven fabric sheet characterized by molding a thermoplastic resin by a melt-blown method into a resin molded article in nonwoven fabric form; and subsequently press-molding said resin molded article in nonwoven fabric form with an elastic pressing means having a Young's modulus of 20 kg-f/cm² to 600 kg-f/cm² at a temperature lower than the melting point of the thermoplastic resin, the pressing means being a rubber roller, wherein the pressing means comes into contact with at least one surface of the nonwoven fabric sheet and wherein the temperature of the pressing means is 50° C. or more.

2. The method of producing the nonwoven fabric sheet according to claim 1, wherein the pressing means has a Young's modulus of 20 kg-f/cm² to 300 kg-f/cm².

3. The method of producing the nonwoven fabric sheet according to claim 1, wherein the pressing means comes into contact with at least one surface of the nonwoven fabric sheet and the temperature of the pressing means is 80° C. or more.

4. The method of producing the nonwoven fabric sheet according to claim 1, wherein the thermoplastic resin is polypropylene.

5. The method of producing the nonwoven fabric sheet according to claim 3, wherein the thermoplastic resin is a methylpentene-based polymer.

6. The method of producing the nonwoven fabric sheet according to claim 1, wherein the press-molding is performed at a temperature lower than the melting point of the thermoplastic resin by 10° C. or more.

7. The method of producing the nonwoven fabric sheet according to claim 3, wherein the press-molding is performed at a temperature lower than the melting point of the thermoplastic resin by 10° C. or more.

8. The method of producing the nonwoven fabric sheet according to claim 4, wherein the press-molding is performed at a temperature lower than the melting point of the thermoplastic resin by 10° C. or more.

9. The method of producing the nonwoven fabric sheet according to claim 5, wherein the press-molding is performed at a temperature lower than the melting point of the thermoplastic resin by 10° C. or more.

10. The method of producing the nonwoven fabric sheet according to claim 1, wherein the press-molding is performed with the rubber roller and a metal roller.

11. The method of producing the nonwoven fabric sheet according to claim 3, wherein the press-molding is performed with the rubber roller and a metal roller.

12. The method of producing the nonwoven fabric sheet according to claim 10, wherein the temperature of the rubber roller is from 50° C. according to 100° C. and the temperature of the metal roller is from 80° C. to 130° C.

13. The method of producing the nonwoven fabric sheet according to claim 10, wherein the temperature of the rubber roller is from 90° C. according to 170° C. and the temperature of the metal roller is from 120° C. to 200° C.

* * * * *